No. 611,505. Patented Sept. 27, 1898.
G. PETERSON.
IRRIGATING MACHINE.
(Application filed Feb. 12, 1898.)
(No Model.) 2 Sheets—Sheet 1.
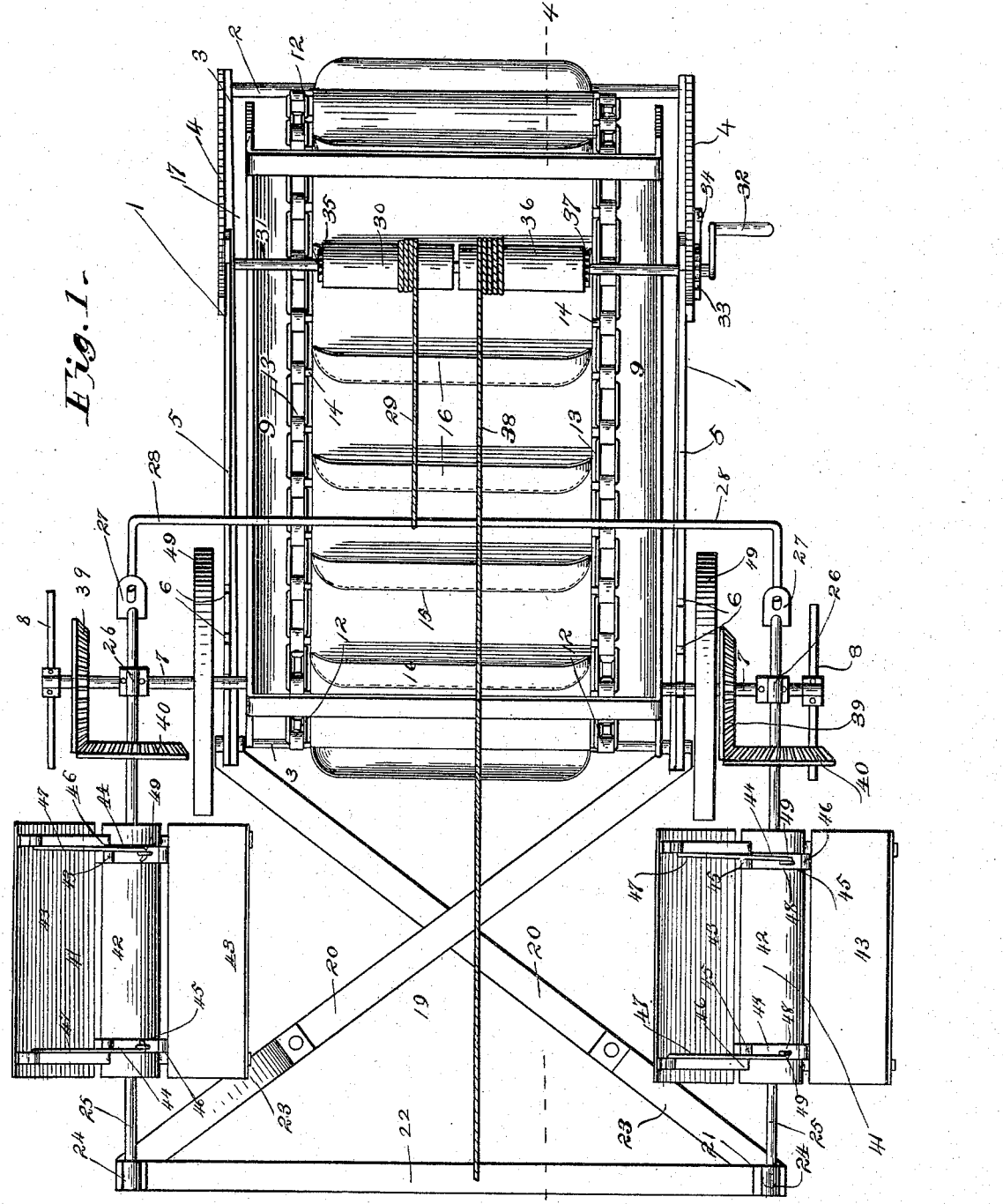
Witnesses
C. N. Walker,
H. L. Ames
Inventor
George Peterson,
by V. D. Shackbridge,
his Attorney.

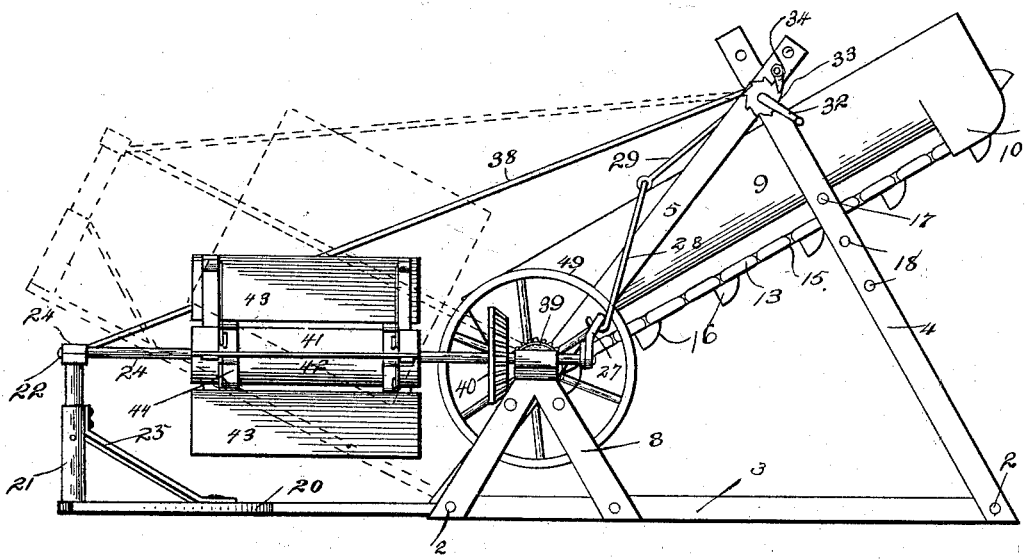

No. 611,505. Patented Sept. 27, 1898.
G. PETERSON.
IRRIGATING MACHINE.
(Application filed Feb. 12, 1898.)
(No Model.) 3 Sheets—Sheet 3.
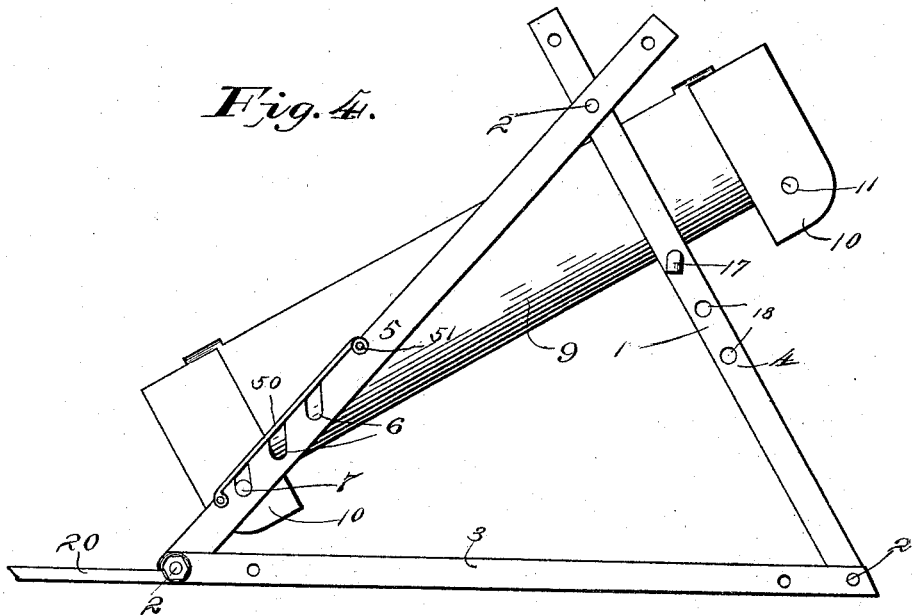
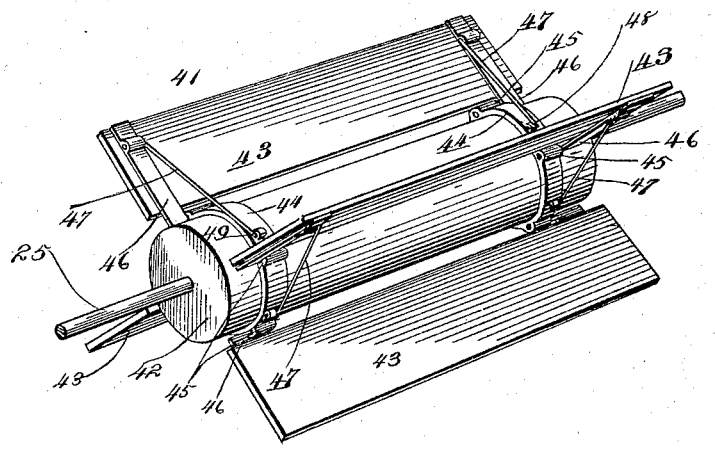

UNITED STATES PATENT OFFICE.

GEORGE PETERSON, OF BROWNING, MONTANA.

IRRIGATING-MACHINE.

SPECIFICATION forming part of Letters Patent No. 611,505, dated September 27, 1898.

Application filed February 12, 1898. Serial No. 670,115. (No model.)

*To all whom it may concern:*

Be it known that I, GEORGE PETERSON, a citizen of the United States, residing at Browning, in the county of Teton and State of Montana, have invented certain new and useful Improvements in Irrigating-Machines; and I do hereby declare the following to be a full, clear, and exact description of the invention, such as will enable others skilled in the art to which it appertains to make and use the same.

My invention relates to novel irrigating apparatus.

The object of the invention is to provide simple and efficient means for transferring water from a flowing stream to an arid area without the necessity for the employment of actuating mechanism other than that which receives its power from the flowing water.

To the accomplishment of this general object, the present embodiment of my invention consists in the aggroupment in operative relations of water-wheels, an endless conveyer, mechanism for adjusting the conveyer to suit the contingencies of use, mechanism for elevating the water-wheels when not desired for use, and supporting mechanism capable of an arrangement which will permit the entire device to be transported from place to place on wheels carried by the frame.

The invention further consists in certain novel details of construction and in the arrangement of parts to be described and claimed, the special and subordinate objects and advantages of which will hereinafter more fully appear.

Referring to the drawings, Figure 1 is a top plan view of my device complete. Fig. 2 is a side elevation thereof, showing the water-wheels elevated in dotted lines. Fig. 3 is a central longitudinal section on the line 4 4 of Fig. 1. Fig. 4 is a side elevation of the conveyer-frame and the supporting-frame, showing the manner of adjusting the relations of said frames; and Fig. 5 is a detail perspective view of one of the water-wheels detached.

Referring to the numerals on the drawings, 1 indicates the supporting-frame of my device, which consists of two substantially triangular frame-sections located in parallel relation and suitably braced by transverse brace-bars 2. Each of these frame-sections consists of a brace-bar 3, a front bar 4, and a rear brace-bar 5, adjustably connected at its forward extremity to the bar 4 and at its lower extremity to the rear end of the bar 3. Each of the brace-bars 5 is provided immediately above its lower end with a series of bearing-recesses 6, designed to receive a power-shaft 7, which is made vertically adjustable by means of the series of bearing-recesses. The outer ends of the power-shaft are journaled in suitable adjustable shaft-supports 8, and intermediate of the frame-sections the said shaft supports one end of a conveyer-frame 9 of any suitable form, but preferably of the trough shape illustrated, and provided at its opposite ends and upon its opposite sides with depending bearing-brackets 10 for the reception at its lower end of the power-shaft 7 and at its opposite end of a conveyer-shaft 11. Each of the shafts 7 and 11 is provided adjacent to the inner sides of the conveyer-frame with sprocket-wheels 12, over which pass sprocket-chains 13, connected by transverse rods 14, to which is secured an endless conveyer-belt 15, provided with transverse buckets or pockets 16 of any suitable form, the conveyer-belts being preferably formed from stout canvas and the pockets being formed from strips of similar material sewed around three sides to the belt.

The forward or upper end of the conveyer-frame is supported upon a conveyer-frame-supporting rod 17, extending between the front bars 4 of the frame-sections and adjustable thereon by means of a series of apertures 18, formed in said bars and designed for the reception of the opposite extremities of the rod. It will thus be seen that power applied to the power-shaft 7 will serve to operate the endless conveyer and that the elevation and inclination of the conveyer-frame may be effected by the adjustment of the conveyer-frame-supporting rod 17.

19 indicates what may be termed a "wheel-frame," consisting of a pair of diagonal brace-pieces 20, pivoted at their front ends to the rear extremities of the frame-bars 3 and pivotally supporting at their outer extremities telescoping adjustable standards 21, supporting a transverse bar 22, additionally braced by diagonal adjustable end braces 23 and designed to support in bearing-boxes 24 the rear ends of the wheel-shafts 25. These wheel-shafts are journaled adjacent to their front ends in journal-boxes 26, loosely mounted upon the power-shaft 7, and the extremities of the wheel-shafts are connected to links 27, pivotally connected to the depending ends of a bail 28, which extends over the conveyer-frame and is supported by a flexible piece 29, secured at its opposite end upon a windlass 30. The windlass is mounted upon a windlass-shaft 31, journaled at its opposite ends in the frame-rods 4 and 5 at their points of juncture, the windlass-shaft being provided upon one end with a crank 32 and ratchet 33, designed to be engaged by a spring-pawl 34, carried by one of the frame-rods. The windlass 30 is connected to the shaft by pawl-and-ratchet mechanism 35, and to one side of it is mounted a second windlass 36, likewise connected to the shaft by pawl-and-ratchet mechanism 37 and upon which is wound a flexible piece of cable 38, secured at its opposite extremity to the bar 22 of the wheel-frame. It will thus be seen that by operating the windlass-shaft through the crank the bail 28 may be elevated sufficiently to support the wheel-shafts 25 and remove the strain from the journal-boxes 26, loosely mounted in a manner described upon the power-shaft 7. It will also be seen that by the operation of the windlass-shaft and the winding of the flexible piece 38 upon the windlass or drum 36 the wheel-frame can be elevated to the position shown in dotted lines in Fig. 2 of the drawings, thereby removing the water-wheels, to be described, from the water and throwing the entire device out of operation.

Gear-wheels 39 are keyed or otherwise secured upon the power-shaft 7, adjacent to the supporting-standards, and mesh with gear-wheels 40, keyed or otherwise secured upon the wheel-shafts 24.

41 41 indicate a pair of water-wheels consisting, respectively, of an elongated hub 42, keyed upon the wheel-shafts and from which extend radially a concentric series of wings or blades 43. These wheels are of novel and convenient form, and I will therefore describe their construction in detail.

The hubs 42 are preferably made of some light durable material—as, for instance, hard wood—and are encircled adjacent to their opposite ends by metal bands 44, provided with longitudinally coincident bearing-loops 45, designed for the reception of oppositely-disposed bearing-hooks 46, extending from the inner edges of the wings or blades 43. The blades are braced by brace-rods 47, hinged at the outer edges of the wings adjacent to their ends and are provided at their opposite extremities with hooks 48, which engage loops 49, formed on the bands 44. It will thus be seen that when the wheels are organized for use they are rigid, but that when desired the brace-rods may be released from the loops and the bands may be moved inwardly until they are disengaged from the bearing-hooks carried by the blades. The latter may now be removed and packed in small compass and the hubs, if desired, may be removed from the wheel-shafts. Ordinarily, however, it is not necessary to remove the wheels or their connected mechanism, as when it is desired to transport the apparatus it is simply necessary to elevate the wheel-frame in a manner described, and by adjusting the power-shaft 7 to the lowest recess and adjusting the conveyer-frame-supporting rod to the lowest apertures in the frame-rods 4 the lower or brace frame-rods 3 will be sufficiently elevated with respect to the conveyer-frame to permit the wheels 49, loosely mounted upon the power-shaft 7, and the conveyer-shaft at the opposite end of the frame to come into contact with the ground and permit the device to be drawn by draft-animals or suitable propelling mechanism, the supporting-standards of the power-shaft being at such time either entirely removed or inverted to prevent their contact with the ground. Bars 50 are pivoted to the brace-bars 5 of the elevator-frame to normally overlie the shaft 7, and suitable fastening devices, such as pins or set-screws 51, serve to secure the free ends of said bars 50 in place for holding the power-shaft 7 in its bearing-sockets in said brace-bars.

The operation of my device is as follows: Supposing the apparatus to be organized as illustrated in Figs. 1 and 2 of the drawings, the water-wheels and the lower end of the conveyer being submerged, the current will operate the wheels and through the intermediate mechanism will cause the operation of the endless conveyer, the buckets of which will be successively filled with water, which will be conveyed to the front or upper end of the conveyer-frame and will be deposited in a suitable chute or reservoir, from which the irrigating-pipes are lead to arid districts designed to be supplied with water. Inasmuch as this chute-reservoir and pipe arrangement is ordinary and well understood by those skilled in the art, I have not deemed it necessary to describe the same in detail or to illustrate it in the drawings.

Slight variations of elevation of the water-wheels—as, for instance, to accommodate the flow and ebb of the tide—may be effected by the adjustment of the standards at the outer ends of the wheel-frame, or if necessary to further elevate the wheels they may be properly adjusted by the elevation of the wheel-frame through the windlass mechanism defined. It is obvious that the rotation of the water-wheels will through the gearing impart rotary motion to the power-shaft, and the latter will by the engagement of the sprocket-wheels and chains cause the endless conveyer to be operated to elevate and deposit the water in an obvious manner; but while the present embodiment of my invention appears to be preferable I do not desire to limit myself to the structural details set out, but reserve the right to change, modify, or vary them at will within the scope of the protection prayed.

Having thus described my invention, what I claim as new, and desire to secure by Letters Patent, is—

1. In an irrigating apparatus, the combination with a conveyer-frame and conveyer, of a wheel-frame, a water-wheel carried thereby and operatively connected with the conveyer, and means for adjusting the wheel-frame, substantially as specified.

2. In an irrigating apparatus, the combination with a conveyer, of a swinging conveyer-frame, a wheel-frame, a water-wheel carried by said wheel-frame and operatively connected with the conveyer, means for adjusting the water-wheel upon the frame, and means for elevating said wheel-frame, substantially as specified.

3. In an irrigating apparatus, the combination with suitable supports, of a conveyer-frame adjustably carried by the supports, a conveyer upon the conveyer-frame, a wheel-frame, a water-wheel carried by the wheel-frame and operatively connected with the conveyer, and means for elevating the wheel-frame, substantially as specified.

4. The combination with a suitable support, of a conveyer-frame, an endless conveyer carried by the frame, a swinging wheel-frame, a water-wheel carried thereby and operatively connected with the conveyer, a windlass supported by the conveyer-frame, and a flexible piece connecting the outer end of the wheel-frame to said windlass, substantially as specified.

5. The combination with a conveyer-frame and conveyer thereon, of a power-shaft operatively connected with the conveyer, journal-boxes loosely mounted upon said power-shaft, a wheel-frame, wheel-shafts journaled in said bearing-boxes, and gearing intermediate of the power-shaft and wheel-shaft, substantially as specified.

6. The combination with a suitable supporting-frame, of a conveyer-frame and a conveyer thereon, a power-shaft operatively connected with the conveyer, a wheel-frame pivotally connected to the supporting-frame, journal-boxes carried by the power-shaft and wheel-frame, a wheel-shaft journaled in said boxes, gearing intermediate of the wheel-shaft and power-shaft, and a water-wheel upon the wheel-shaft, substantially as specified.

7. The combination with a supporting-frame, conveyer-frame and conveyer, of a power-shaft operatively connected with the conveyer, a wheel-frame pivoted to the supporting-frame, journal-boxes carried by the power-shaft and wheel-frame respectively, a water-wheel carried by the wheel-shaft, adjustable mechanism for supporting the front extremity of the wheel-shaft, gearing intermediate of the shafts, and mechanism for elevating the wheel-frame, substantially as specified.

8. The combination with a supporting-frame, of a conveyer-frame adjustable thereon, an adjustable wheel-frame secured thereto, a conveyer carried by the conveyer-frame, a wheel carried by the wheel-frame, and means for operatively connecting the conveyer and water-wheel, substantially as specified.

9. The combination with a conveyer-frame provided with wheels, of a supporting-frame adjustable with respect to the conveyer-frame, and designed to support the wheels out of contact with the ground or to permit them to be lowered into contact therewith for the purpose of transporting the apparatus, substantially as specified.

10. A wheel-frame pivotally carried by the supporting-frame, a water-wheel carried by the wheel-frame, a conveyer carried by the conveyer-frame and operatively connected with the water-wheel, and mechanism carried by said conveyer-frame for elevating the wheel-frame, substantially as specified.

11. The combination with a supporting-frame provided with a series of bearing-recesses and with a series of apertures, of a conveyer-frame, a power-shaft carried thereby and designed to be adjustably journaled in the bearing-recesses, a conveyer-frame, supporting-rods adjustable upon the supporting-frame and engaging the apertures, a conveyer carried by the conveyer-frame, and conveyer irrigating mechanism, substantially as specified.

12. The combination with a conveyer-frame and conveyer, of a power-shaft operatively connected with the conveyer, a wheel-shaft geared to the power-shaft, and mechanism for vertically adjusting said shafts, substantially as specified.

13. The combination with a conveyer-frame and conveyer, of a wheel-frame, longitudinally-extensible standards constituting a portion of the wheel-frame, a power-shaft operatively connected with the conveyer, a wheel-shaft operatively connected with the power-shaft, and supported by the wheel-frame, and a water-wheel carried by the wheel-shaft, substantially as specified.

14. In a water-wheel, the combination with a hub, of a plurality of bearing-bands carried thereby and provided with loops, of blades provided with oppositely-disposed hooks engaging the loops, and braces secured at their opposite ends to the blades, and to the bands, substantially as specified.

In testimony whereof I affix my signature in presence of two witnesses.

GEORGE PETERSON.

Witnesses:
JOHN HUNSBERGER,
CHARLES PETERSON.